United States Patent [19]

Alexander

[11] Patent Number: 4,634,136
[45] Date of Patent: Jan. 6, 1987

[54] WIND POWERED PROPULSION DEVICE

[76] Inventor: Linc W. Alexander, P.O. Box, 34244 Station "D", Vancouver, British Columbia, Canada, V6J 4N8

[21] Appl. No.: 666,296

[22] Filed: Oct. 30, 1984

[51] Int. Cl.⁴ .......................................... B62B 15/00
[52] U.S. Cl. .................................. 280/213; 280/810
[58] Field of Search ............... 280/213, 810; 180/2.2, 180/7.1; D12/114; 114/39, 102, 106, 107; 244/DIG. 13, 218

[56] References Cited

U.S. PATENT DOCUMENTS

| | | | |
|---|---|---|---|
| 947,731 | 1/1910 | Louder | 280/213 |
| 2,018,062 | 8/1935 | Hardt | 280/810 |
| 3,381,647 | 5/1968 | Keeler | 114/39 |
| 3,836,176 | 9/1974 | Ylvisaker | 280/213 |
| 4,441,728 | 4/1984 | Schroeder | 280/213 |
| 4,480,570 | 11/1984 | Rosenfield | 114/39 |
| 4,501,216 | 2/1985 | Voslanber | 114/102 |

FOREIGN PATENT DOCUMENTS

| | | | |
|---|---|---|---|
| 102888 | 5/1878 | Fed. Rep. of Germany | 280/213 |
| 13780 | 6/1903 | Fed. Rep. of Germany | 280/810 |
| 2162547 | 6/1973 | Fed. Rep. of Germany | 114/106 |
| 3149838 | 6/1983 | Fed. Rep. of Germany | 114/102 |
| 1499954 | 11/1967 | France | 280/810 |

*Primary Examiner*—John J. Love
*Assistant Examiner*—Mark C. Dukes
*Attorney, Agent, or Firm*—Fetherstonhaugh & Co.

[57] ABSTRACT

A wind powered propulsion device has a sail mount and harness means for retaining the sail mount on the back of a person. A sail is mounted on the sail mount. Preferably the harness means includes a backpack-like device having a back rest and strap for fitting over the shoulders and around the waist of a person. The mount may include a mast for holding the sail in a generally vertical position and a swinging arm. The sail is mounted at a first end of the swinging arm which is pivotal at a second end about an axis through the sail mount.

17 Claims, 11 Drawing Figures

WIND POWERED PROPULSION DEVICE

BACKGROUND OF THE INVENTION

This invention relates to a wind powered propulsion device including a sail and a backpack-like device for fitting over the shoulders and around the waist of a person.

The wind has been used extensively in the past and is presently used for powering marine vessels and, less extensively, vehicles. For example, a bicycle sail is disclosed in U.S. Pat. No. 3,836,176 to Ylvisaker. The sail in this case is curved in a somewhat airfoil-like shape. Other sails for bicycles are shown in U.S. Pat. No. 639,107 to Sorensen and U.S. Pat. No. 3,381,647 to Keeler. The latter shows an airfoil sail including a plurality of horizontal, vertically spaced ribs.

Sails for bicycles have not been widely used because in many cases the bicycle becomes unstable when provided with a sail. In addition, past devices have required modification of the bicycle or have been difficult to install. It would therefore be convenient to provide a device for wind propulsion of bicycles, other vehicles and small water craft which would be portable and easy to use without any modification of the propelled device.

SUMMARY OF THE INVENTION

According to the invention, a wind powered propulsion device comprises a sail mount and harness means for retaining the sail mount on the back of a person. A sail is mounted on the sail mount.

The harness means may comprise a backpack-like device having a back rest and straps for fitting over the shoulders and around the waist of a person.

The mount may comprise means for holding the sail in a generally vertical position and means for swinging the sail from side to side to adjust for the wind direction.

In a preferred form, the means for swinging comprises swinging arm means having the sail mounted at a first end which is pivotal at a second end about an axis through the sail mount. The sail is generally vertical when the device is mounted on the back of an upright person.

The device may further include a mast means for the sail means associated with the mast means and means for deploying and retracting the sail. The means for deploying and retracting may include a spring biased roller near the mast means, the sail being sheet-like and being connected to the roller. The means for deploying and for retracting may further include support rod means connected to an end of the sail opposite the roller and means for moving the support rod means away from the mast means. The means for deploying and for retracting may also include a plurality of support arms, each being hingedly connected to the mast means at a first end and being slidably connected to the support rod means at a second end. The support arms may each have a plurality of segments interconnected by hinges, the device including a mechanism for moving the segments about the hinges so the sail forms an airfoil shape.

BRIEF DESCRIPTION OF THE DRAWINGS

In the drawings:

FIG. 2 is an enlarged, fragmentary top plan of the device;

FIG. 3 is a fragmentary rear elevation of the device;

FIG. 5 is an enlarged, fragmentary front elevation thereof;

FIG. 6 is a front elevation of the locking scale and deployment handle thereof;

FIG. 7 is a side elevation of the locking scale and deployment handle;

FIG. 9 is a top plan of a support arm shown straight;

FIG. 10 is a plan view of a support arm assuming an airfoil shape; and

FIG. 11 is a simplified top plan of the spring biased roller for deploying and retracting the sail.

DESCRIPTION OF THE PREFERRED EMBODIMENTS

Figure 1:
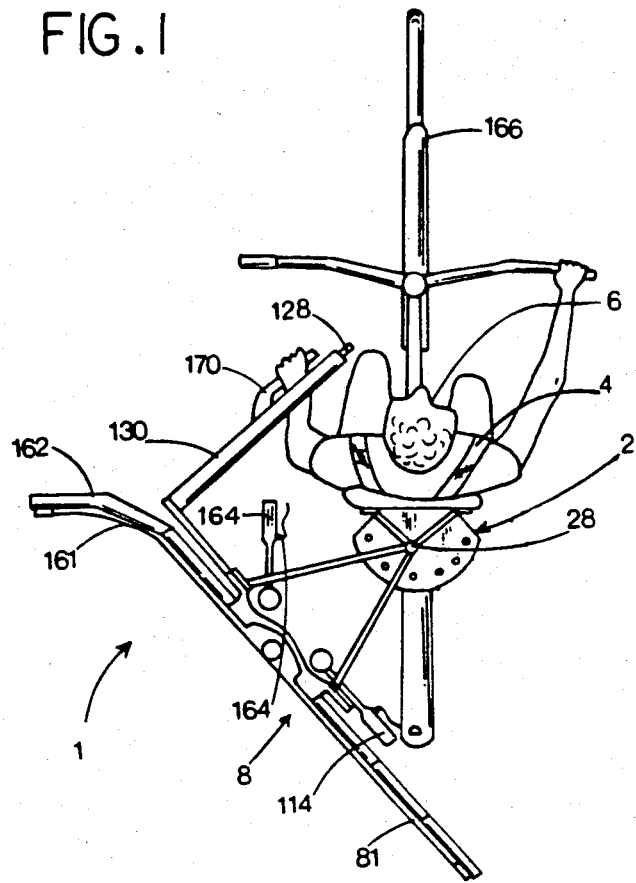
FIG. 1 is a top plan of a wind powered propulsion device, according to an embodiment of the invention, mounted on the back of a person riding a bicycle.
Figure 1A:
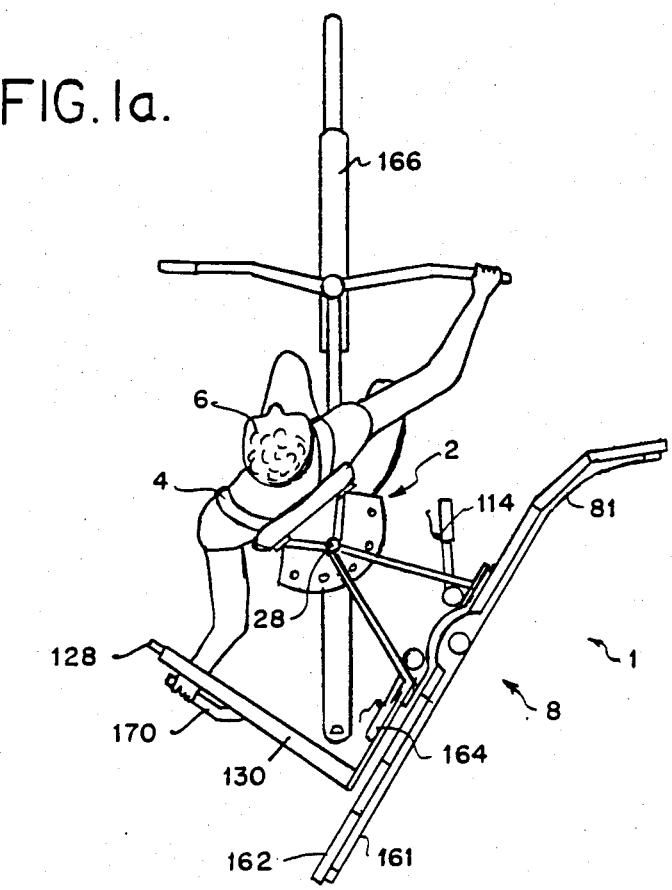

Referring to FIG. 1, this illustrates a wind powered propulsion device 1 which includes a sail mount 2 and a harness 4 for retaining the sail mount on the back of a person 6. A sail 8 is mounted on the sail mount 2.

Figure 4:
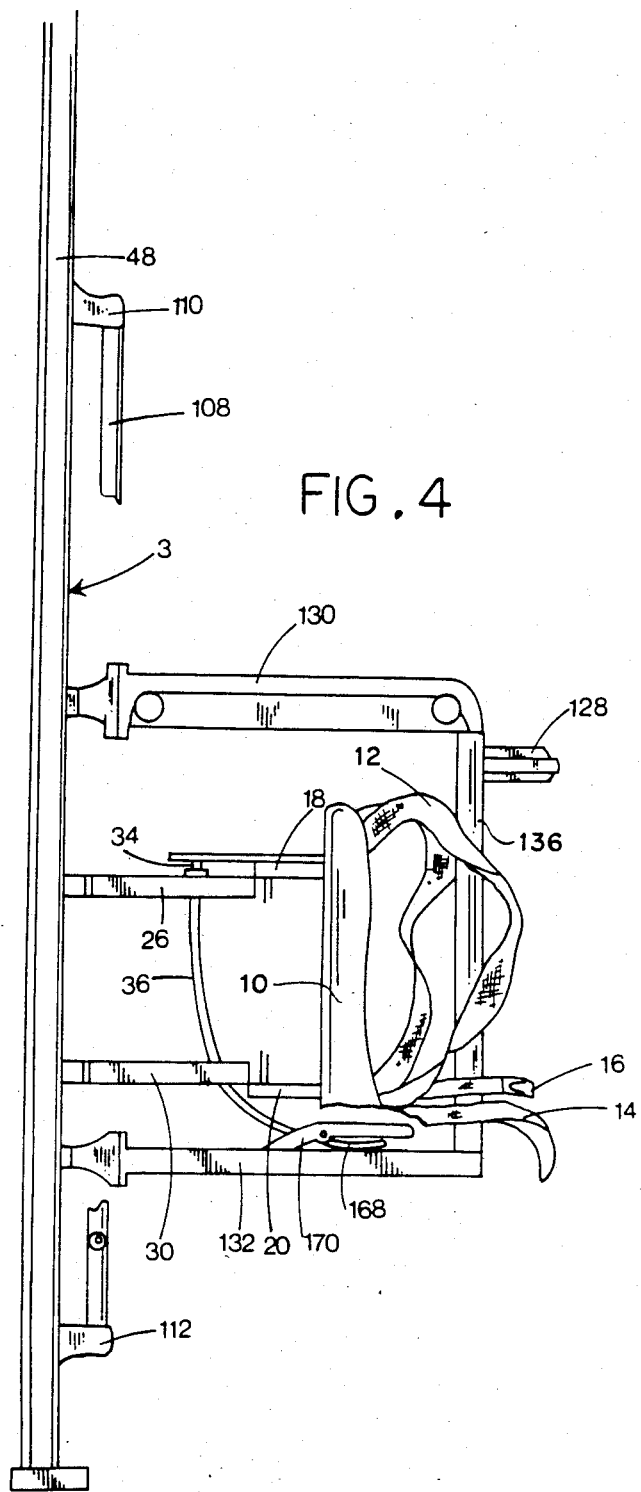
FIG. 4 is a side elevation thereof.

Referring to FIGS. 2 and 4, the harness includes a back pad 10 which is relatively rigid and contoured to comfortably fit the back of a person. Shoulder straps 12 and a waist strap 14, provided with a buckle 16, are connected to the back pad.

An upper angle bracket 18, shown best in FIG. 2, and a similar lower angle bracket 20, shown in FIG. 4, extend rearwardly from the back of the back pad. These are connected to the back pad by rivets or other such means. An adjustment fan 22 is mounted on top of angle bracket 18 and has a plurality of apertures 24 extending in a circular arc about the adjustment fan. A pair of upper angle arms 26 are hingedly connected to brackets 18 and 20 by pins 28. The unit is provided with a similar pair of lower angle arms 30, shown in FIG. 4, also hingedly connected to angle brackets 18 and 20 by pins 28. A connecting member 32 extends between the pair of angle arms 26 below adjustment fan 22 and is provided with a vertically slidable locking pin 34. The locking pin is actuated by a control cable 36 to selectively engage one of the apertures 24 on the adjustment fan, thus locking the angle arm in a particular rotational position with respect to the angle brackets 18 and 20 and the back pad 10.

The upper angle arms 26 are connected to flanges 38 and 40 of mast 3 by sets of nuts and bolts 42 and 44. The lower angle arms 30 are connected to corresponding flanges on the mast in a similar manner.

Mast 3 consists of a pair of spaced-apart uprights 46 and 48 connected together by bolts 52 and 54 on brackets 50 and 51 as well as by mounts 53 and 55. A recess 56 exists between the uprights 46 and 48 extending from near the top of mast to near the bottom as shown in FIG. 3. However, the mast has connecting portions 58 and 60, above and below recess 56 respectively, which extend between the uprights 46 and 48. These connecting portions serve as bearings for axle 62 of spring loaded roller reefer 64 which is thus rotatably mounted on the mast in a vertical position between the uprights.

Four swing arms 66, 68, 70 and 72 are each hingedly connected to upright 48 by a hinge 74 as shown in detail for swing arm 66 in FIG. 9. The hinges permit the swing arms to swing between the vertical positions shown in solid lines in FIG. 3 and the horizontal lowered positions shown in broken lines or intermediate positions shown in chain lines. Referring to FIGS. 10 and 11, a roller 76 is rotatably mounted near the outer end of each swinging arm by means of an axle 78. The rollers 76 are each slidably received within a channel-shaped, vertical support rod 80 which is substantially equal in length to mast 3.

A sail fabric 82 is connected to support rod 80 at one end and to roller reefer 64 at the opposite end.

Referring to the swing arms in more detail, swing arm 66 is shown as an example and includes three segments 82, 84, and 86 interconnected by hinges 88 and 90. Movement of the hinged segments is controlled by push rods 92 and 94 acting through bellcrank 96 and control arm 98. These serve as a mechanism for moving the segments about the hinges 88 and 90 so the swing arm, and consequently sail fabric 81, form an airfoil shape as shown in FIG. 10 or the straight shape illustrated in FIG. 9.

Figure 8:
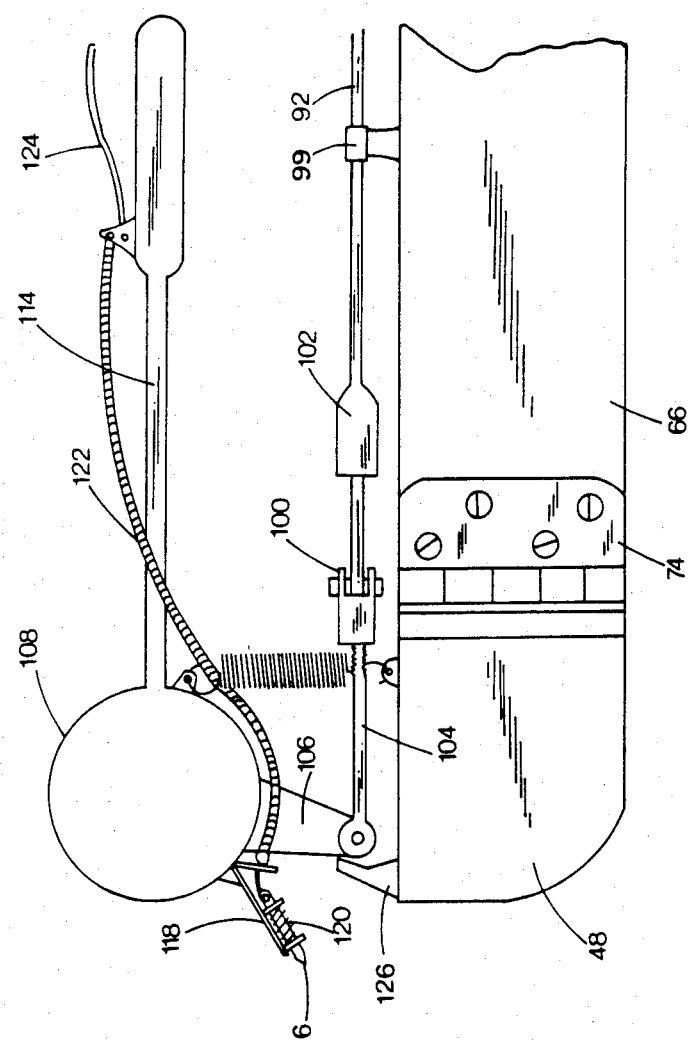
FIG. 8 is a sectional view taken along line 8—8 of FIG. 3 with a support arm in the horizontal position.

Referring to FIG. 8, the push rod 92 for each of the swing arms extends through a guide 99 on the swing arm and is connected to a clevis 100 through an intermediate treaded adjustor 102. Clevis 100 is treadedly connected to a short control rod 104 which is hingedly connected to a control arm 106. The control arm 106 for each of the swing arms is connected to a vertical control tube 108. As shown in FIG. 4, control tube 108 is rotatably mounted in upper and lower socket members 110 and 112 which are connected to upright 48. Referring again to FIG. 8, an airfoil lever 114 extends outwardly from control tube 108 and is used to turn the control tube and thus place the sail in the straight position of FIG. 9 or the airfoil shape of FIG. 10. A pointed latch member 116 is slidably mounted on a bracket 118 mounted on control tube 108. The latch member is biased towards the illustrated extended position by a coil spring 120. A control cable 122 connects the latch member to an airfoil stop control lever 124. The sail is moved into the airfoil shape of FIG. 10 by squeezing airfoil stop control lever 124 against airfoil lever 114 with the hand and then rotating control tube 108 anticlockwise, from the point of view of FIG. 8, moving lever 114 until latch member 116 passes stop 126 mounted on upright 48. Lever 124 is then released which returns latch member 116 to the extended position under the action of spring 120 and thus stop 126 holds the sail in the airfoil shape.

The deployment of sail fabric 81 is controlled by a deployment handle 128 at the end of two spaced-apart levers 130 and 132 extending forwardly from mast 3. Handle 128 is connected to a block 134 slidably received within channel-shaped control column 136. A spring biased pawl 138 on the back of block 134 selectively engages one of the spaces between two of the teeth 140 vertically aligned along the control column. Push bar 142 on the bottom of deployment handle 128 is pushed to retract pawl 138 by means of wedge member 139 and allows the deployment handle to move freely upwards along control column 136. Push bar 144 on top is pushed to extend pawl 138 to engagement between two of the teeth 140 and thus prevents upwards movement of the deployment handle but allows downward movement by "clicking" of the spring biased pawl along the teeth.

A cable 146 is connected to the top of block 134 and extends over a pulley 148. Referring to FIG. 5, it may be seen that cable 146 is connected to a cable extending to each of the swing arms by means of a system of pulleys and cables. For example, cable 146 is connected to swing arm 70 by means of cable 149 which extends over pulley 150 mounted on the end of a pulley arm 152 connected to mast 3. Cable 146 is connected to cable 154 of swing arm 72 and then extends about double pulleys 158 and then pulley 156 on pulley arm 160 to cable 146. Thus, it may be observed that, by moving deployment handle 128 downwardly along control column 136, swing arms 66, 68, 70 and 72 swing downwardly from the raised vertical position illustrated in FIG. 5 to either one of the intermediate positions, one of which is shown in chain lines in FIG. 3, or the fully deployed, horizontal position shown in broken lines in FIG. 3. The pivoting of the swing arms causes support rod 80 to move outwardly away from mast 3 and thus deploys sail fabric 81. The sail may be partially deployed as shown in chain lines in FIG. 3 or fully deployed as shown in broken lines in FIG. 3. The deployment of the sail causes clockwise rotation of roller reefer 64 shown in FIG. 11. The sail thus unwinds from the roller reefer which is resiliently biased in the anticlockwise direction. It should be noted that sail fabric 161 is deployed at the same time on the opposite side of the roller reefer from sail fabric 81. The sail mechanism has been described only with respect to the right hand side of the mast from the point of view of FIG. 1. However, identical swing arms, such as swing arm 162, are employed on the opposite side of the mast for deployment of the sail. These swing arms are also formed by hingedly connected segments to form an airfoil shape as shown in FIG. 1 controlled by another airfoil lever 164.

In use, the device is strapped on to the back of a person 6 using harness 4 including shoulder straps 12 and waist strap 14. The device may be used for propelling a bicycle 166 as shown in FIG. 1, or, alternatively, roller skates, another vehicle, or a surf board. These are examples only. After securing the device on the back of the person, the person chooses the proper angle of the sail according to the wind direction. Cable 36 is connected to a sail release handle 168 shown in FIG. 4. This handle is depressed to move locking pin 34 downwardly and out of engagement with aperture 24 shown in FIG. 2. A sail angle handle 170, mounted on lever 132, as shown in FIG. 1, is used to rotate the sail about pins 28 to the desired direction. Two possible positions are shown in solid lines in FIG. 1 and also in broken lines in this figure. When the chosen sail angle is reached, handle 168 is relieved to engage locking pin 34 and hold the sail in that position.

The person then uses deployment handle 128 to deploy sail fabrics 81 and 161. Push bar 144 is depressed and handle 128 is moved downwardly until the sails are deployed to the desired extent. Pawl 138 prevents the deployment handle from moving upwardly to retract the sail fabrics. When this is desired, however, push bar 142 is pushed to retract pawl 138. This must only be done when the swing arms are straight.

The person may choose to have the sail in the airfoil shape shown on the left side of FIG. 1 according to wind velocity and conditions. However, the airfoil shape can only be achieved when the sails are fully deployed by moving handle 128 to the bottom of control column 136. The swing arms must be horizontal before they can be articulated. As described previously, the airfoil lever 114 is used to achieve the airfoil shape on one side of the sail, while airfoil lever 164 is used for the same purpose on the opposite side. During use, the person may change the shape of the sail, the amount of sail deployed as well as the angle of the sail according to his wishes and conditions encountered.

What is claimed is:

1. A wind powered propulsion device comprising:
   (a) a sail mount;
   (b) harness means for retaining the sail mount on the back of a person;
   (c) a sail mounted on the sail mount, so the sail is substantially upright when the person's back is erect;
   (d) a mast means for the sail;
   (e) means for deploying and for retracting the sail that includes a spring biased roller near the mast means said means for deploying and retracting the sail further including support rod means connected to an end of the sail opposite the roller;
   (f) means for moving the support rod means away from the mast means;
   (g) the sail including a sail fabric connected to the roller.

2. A device as claimed in claim 1, wherein the harness means comprises a back pack-like device having a backrest and straps for fitting over the shoulders and around the waist of a person.

3. A device as claimed in claim 1, wherein the mount comprises means for holding the sail in a generally vertical position and means for swinging the sail from side to side to adjust for the wind direction.

4. A device as claimed in claim 3, wherein the means for swinging comprises swing arm means having the sail mounted at a first end and being pivotal at a second end about an axis through the sail mount, the axis being generally vertical when the device is mounted on the back of an upright person.

5. A device as claimed in claim 4, further comprising locking means for selectively locking the swinging arm means in a desired position.

6. A device as claimed in claim 5, wherein the locking means includes a pin selectively engagable in one of a plurality of apertures.

7. A device as claimed in claim 4, wherein the means for swinging further comprises a control arm connected to the means for holding the sail and having an end accessible to one of the person's hands.

8. A device as claimed in claim 7, further comprising a control for the locking means near the end of the arm.

9. A device as claimed in claim 1, wherein the means for deploying and for retracting further comprises a plurality of support arms each being hingedly connected to the mast means at a first end and being slidably connected to the support rod means at a second end.

10. A device as claimed in claim 9, wherein the support arms are resiliently biased towards a retracted position against the mast means and generally perpendicular to the mast means when the sail is fully deployed.

11. A device as claimed in claim 10, wherein each said support arm has a plurality of segments interconnected by hinges, the device including a mechanism for moving the segments about the hinges so the sail forms an airfoil shape.

12. A device as claimed in claim 11, wherein the mechanism for moving includes a plurality of hingedly connected push rods.

13. A device as claimed in claim 12, comprising two said sails and associated support rod means and support arms on opposite sides of the mast means, each said sail being connected to the roller.

14. A device as claimed in claim 1, wherein the means for deploying and for retracting the sail includes locking means for selectively holding the sail fully deployed or partly deployed and for permitting the sail to retract.

15. A device as claimed in claim 14, wherein the locking means comprises a row of spaced apart teeth and a selectively retractable, spring biased pawl.

16. A wind powered propulsion device comprising:
   (a) a sail mount;
   (b) harness means for retaining the sail mount on the back of a person;
   (c) a sail mounted on the sail mount, so the sail is substantially upright when the person's back is erect;
   (d) a mast means for the sail; and
   (e) means for deploying and for retracting the sail that includes a spring biased roller near the mast means, the means for deploying and retracting the sail including locking means for selectively holding the sail fully deployed or partly deployed and for permitting the sail to retract, the sail including a sail fabric connected to the roller.

17. A device as claimed in claim 16 wherein the locking means comprises a row of spaced apart teeth and a selectively retractable, spring biased pawl.

* * * * *